US012057614B2

(12) United States Patent
Dorner et al.

(10) Patent No.: US 12,057,614 B2
(45) Date of Patent: Aug. 6, 2024

(54) DIELECTRIC WAVEGUIDE

(71) Applicant: LEONI KABEL GMBH, Roth (DE)

(72) Inventors: Dominik Dorner, Weissenburg (DE); Thorsten Fink, Nuremberg (DE); Erwin Köppendörfer, Schwabach (DE); Yannick Ramser, Nuremberg (DE); Felix Distler, Rollhofen (DE)

(73) Assignee: LEONI KABEL GMBH, Roth (DE)

( * ) Notice: Subject to any disclaimer, the term of this patent is extended or adjusted under 35 U.S.C. 154(b) by 266 days.

(21) Appl. No.: 17/629,839

(22) PCT Filed: Jul. 3, 2020

(86) PCT No.: PCT/EP2020/068766
§ 371 (c)(1),
(2) Date: Jan. 25, 2022

(87) PCT Pub. No.: WO2021/023445
PCT Pub. Date: Feb. 11, 2021

(65) Prior Publication Data
US 2022/0263211 A1 Aug. 18, 2022

(30) Foreign Application Priority Data
Aug. 5, 2019 (DE) ......................... 102019121120.4

(51) Int. Cl.
*H01P 3/16* (2006.01)

(52) U.S. Cl.
CPC ..................................... *H01P 3/16* (2013.01)

(58) Field of Classification Search
CPC ......................................................... H01P 3/16
USPC ......................................................... 333/239
See application file for complete search history.

(56) References Cited

U.S. PATENT DOCUMENTS

| | | | | |
|---|---|---|---|---|
| 4,465,336 | A | 8/1984 | Huber et al. | |
| 10,826,149 | B2 | 11/2020 | Rusch et al. | |
| 2006/0165358 | A1 | 7/2006 | Trebst et al. | |
| 2007/0147736 | A1 | 6/2007 | Kopp et al. | |
| 2014/0368301 | A1* | 12/2014 | Herbsommer | H01P 3/122 333/239 |
| 2019/0097293 | A1* | 3/2019 | Dogiamis | H01P 5/087 |

FOREIGN PATENT DOCUMENTS

| | | | |
|---|---|---|---|
| CN | 106054311 | A | 10/2016 |
| DE | 1006481 | B | 4/1957 |

OTHER PUBLICATIONS

Large, M., Poladian, L., Barton, G., van Eijkelenborg, M. A. , Microstructured polymer optical fibres, Springer Science & Business Media, 2007, S. 165-179.

(Continued)

*Primary Examiner* — Stephen E. Jones
(74) *Attorney, Agent, or Firm* — Tarolli, Sundheim, Covell & Tummino LLP

(57) ABSTRACT

Disclosed is a dielectric waveguide. A fibre core of the dielectric waveguide is formed by a first fibre core and a second fibre core. The first fibre core and the second fibre core have an intersection in the cross-section of the dielectric waveguide.

8 Claims, 5 Drawing Sheets

(56) References Cited

OTHER PUBLICATIONS

Svetlana V Boriski Na et al: 11 Highly Efficient Full-Vectorial Integral Equation Solution for the Bound, Leaky, and Complex Modes of Dielectric Waveguides 11, IEEE Journal of Selected Topics in Quantum Electronics, IEEE Service Center, Piscataway, NJ, US. Bd. 8, Nr. 6, Nov. 1, 2002 (Nov. 1, 2002), XP011066208, ISSN: 1077-260X Section II, IV; Abbildungen 9,10.

Eikichi Yamashita et al: "Modal Analysis of Homogeneous Optical Fibers with Deformed Boundaries", IEEE Transactions on Microwave Theory and Techniques, Apr. 30, 1979 (Apr. 30, 1979), Seiten 352-356, XP055725201, Gefunden im Internet: URL:https://ieeexplore.ieee.org/stampPDF/g etPDF.jsp?tp=&arnumber=II29629&ref=aHR0cHM6Ly9pZWVleHBsb3JlLmIIZWUub3JnL2RvY3VTZW50LzExMjk2Mjk= [gefunden am Aug. 26, 2020] Section III; Abbildung 2.

V. Ramaswamy et al: "Polarization characteristics of noncircular core single-mode fibers", Applied Optics, Bd. 17, Nr. 18, Sep. 15, 1978 (Sep. 15, 1978), Seite 3014, XP055725195, US ISSN: 0003-6935, DOI: 10.1364/A0.17.003014 Seite 3014-Seite 3015; Abbildungen 1,2.

* cited by examiner

DIELECTRIC WAVEGUIDE

This application filed under 35 U.S.C § 371 is a national phase application of International Application Number PCT/EP2020/068766, filed Jul. 3, 2020, which claims the benefit of German Application No. 10 2019 121 120.4 filed Aug. 5, 2019, the subject matter of which are incorporated herein by reference in their entirety.

Examples relate to concepts for transmitting high-frequency signals, in particular in the W band, by means of dielectric waveguides and applications relating thereto, and in particular to a dielectric waveguide for transmitting linearly polarised electromagnetic waves.

A dielectric waveguide is a type of line for transmitting frequencies in the millimetre wave band, thus a wavelength between 1 mm and 10 mm. The transmissible frequency band is determined in this case primarily by dimensioning of the waveguide.

Compared with other common line types (for example, coaxial lines and hollow conductors), the dielectric waveguide is characterised in that no electrically conductive materials are required, as well as having other advantages. In contrast to metal-bonded waveguides, wave conduction in dielectric waveguides takes place along a boundary layer of materials of different permittivity, also termed dielectric constant.

On account of the skin effect in metal-bonded propagation media (for example, in a coaxial cable), losses can rise sharply, above all at higher frequencies. This can reduce the capacity of the communications channel provided via the waveguide. Furthermore, in the millimetre wave band only very small cross-sections can be realised in the case of coaxial cables due to the cut-off frequency, which likewise leads to higher losses.

In comparison with metal-bonded hollow conductors, dielectric waveguides also have a lower weight in addition to better attenuation properties. Dielectric waveguides are also cheaper and more mechanically flexible.

Dielectric waveguides can thus combine a large number of advantages compared with metal-bonded waveguides.

As already mentioned, apart from an optional metal shield, dielectric waveguides consist exclusively of non-conductive materials. In the simplest case this is a structure with a circular cross-section. Here the air surrounding the structure functions as a boundary medium with a different dielectric constant. This is transmissible to different cross-sectional geometries. In general, circular cross-sectional geometries have no preferred plane in respect of polarisation. This means that the receiver structure for output must necessarily be polarised in a circular manner, which is technically more complex, however.

Rectangular structures with different side lengths are another option. These are dependent on defined edges and corners, however. This cannot be realised using common extrusion methods without additional process steps.

Furthermore, polarisation maintenance is possible with an elliptical structure. Both circular and the elliptical cross-sectional geometries can be manufactured by means of extrusion methods. A tensile medium can be used here. In the metal-bonded case, the conductor of a cable represents the tensile medium. In dielectric waveguides, a non-conductive tensile thread is necessary. Thermal and mechanical demands are to be made on this tensile thread to be able to use it in the extrusion method, however.

Materials that satisfy these demands, however, can have higher dielectric losses than necessary for the extrusion material of the tensile thread. To mitigate this effect as much as possible, the field intensity should be as low as possible in the area of the carrier thread. For the circular and elliptical structure, however, this is located in the centre of the structure and thus in the intensity maximum, which leads to high dielectric losses.

Dielectric waveguides must conceivably be optimised with regard to reducing dielectric losses. It is nonetheless desirable to form a structure for transmitting linearly polarised waves.

A requirement may exist to provide concepts for dielectric waveguides for transmitting linearly polarised waves with reduced dielectric losses.

Such a requirement can be met by the subject matter of the claims.

According to a first aspect, a dielectric waveguide is provided. A fibre core of the dielectric waveguide is formed by a first fibre core and a second fibre core. The first fibre core and the second fibre core have an intersection in the cross-section of the dielectric waveguide.

Due to the geometry of the arrangement of the first fibre core and the second fibre core relative to one another, a linearly polarised wave can be guided through the dielectric waveguide that has fewer dielectric losses on account of the arrangement in the centre of the fibre core formed by the first fibre core and the second fibre core. A cross-sectional geometry can consequently be provided that has polarisation maintenance or a preferred plane for this.

The dielectric waveguide can be understood here in such a way that it has a fibre core and a sheath fitting closely around the fibre core. In this case, a dielectric constant of the fibre core according to the principle of the dielectric waveguide can be greater than a dielectric constant of the sheath. In a simplest implementation variant, the dielectric waveguide can have the fibre core alone.

In the simplest form, the sheath can be a surrounding atmosphere, for example ambient air. The air surrounding the fibre core can consequently function as a dielectric boundary layer. The fibre core according to the first aspect is a fibre core formed jointly from the first fibre core and the second fibre core.

In the cross-section of the dielectric waveguide, the common fibre core can be, expressed mathematically, a coherent region. This also means that the space formed by the (common) fibre core along the dielectric waveguide can be described as coherent.

The first fibre core and the second fibre core can each be fibres along the dielectric waveguide that are connected to one another along the dielectric waveguide. The (common) fibre core of the dielectric waveguide can be formed hereby.

The term "intersection" can be understood here such that the first fibre core and the second fibre core are connected directly to one another. This applies in particular sa along the entire dielectric waveguide.

The first fibre core and the second fibre core can have the intersection in any cross-section of the dielectric waveguide in this regard. For example, it can be each or any cross-section.

The sheath of the dielectric waveguide can be provided or formed by air or the sheath can comprise at least air. The intersection between the first fibre core and the second fibre core can be provided by sections of the first fibre core and the second fibre core that are melted into one another. In particular, the first fibre core and the second fibre core can be melted with one another.

The first fibre core and the second fibre core can have an overlap in the cross-section of the dielectric waveguide due to melting along a longitudinal direction of the dielectric waveguide.

Due to the fact that respective centre points of the first fibre core and the second fibre core are spaced apart, thus do not overlap, a preferred polarisation direction (linear polarisation) can be provided. Coupling and output can be simplified hereby in contrast to circular dielectric waveguides.

The first fibre core and the second fibre core can further run substantially parallel as along the dielectric waveguide. "Along the dielectric waveguide" can be understood here as "along a longitudinal direction of the dielectric waveguide" or "in the longitudinal direction of the dielectric waveguide". The term "substantially parallel" can be understood in this case as a maximum 5% accuracy deviation of the parallel alignment. This can also mean that the intersection of the first fibre core and the second fibre core along the dielectric waveguide varies maximally by 5%.

The first fibre core and the second fibre core can each be substantially circular. Furthermore, the first fibre core and the second fibre core can have substantially identical diameters. This shape can be described as a double-circumference dielectric line geometry. The double-circumference geometry can combine industrialisation capability and good technical properties with one another.

The term "substantially circular" can be understood in this case as a circular form, which does not have to be perfect. Furthermore, the designation "circular" can refer in particular to the respective cross-section of the first fibre core and the second fibre core that these have along the dielectric waveguide. The term "substantially identical" can be understood in this case as maximally 5% accuracy divergence of the diameters.

Centre points of the respective cross-sections of the first fibre core and the second fibre core can have a spacing. The spacing can be greater than half a diameter of one of the first fibre core and the second fibre core. The spacing can also be smaller than the diameter of one of the first fibre core and the second fibre core. The spacing can also correspond to the diameter of one of the first fibre core and the second fibre core. Expressed another way, the spacing can be greater than half a diameter of the first fibre core or greater than half a diameter of the second fibre core. Furthermore, the spacing can be smaller than the diameter of the first fibre core or smaller than the diameter of the second fibre core.

The spacing can also be greater than 0.55 times (or 0.6 times or 0.65 times or 0.7 times or 0.75 times) the diameter of one of the first fibre core and the second fibre core. The spacing can also be smaller than 0.95 times (or 0.9 times or 0.85 times or 0.8 times or 0.75 times) the diameter of one of the first fibre core and the second fibre core.

The dielectric waveguide can further comprise a sheath around the fibre core along the dielectric waveguide. The sheath can have a permittivity that is lower than that of the fibre core. The sheath can have a diameter that is at least 2 times (or 3 times or 4 times or 5 times) as great in comparison with one of the diameters of the first fibre core and the second fibre core. The attenuation can turn out differently depending on the precise diameter of the sheath compared with one of the diameters of the first fibre core and the second fibre core. For example, the attenuation with a diameter of the sheath that is 2 times as great as the diameter of the first fibre core or the second fibre core can turn out higher than with a diameter of the sheath that is 3 times as great as the diameter of the first fibre core or the second fibre core.

The disadvantage that the fibre core is not shielded from external influences can be eliminated by means of the sheath. External influences can be, for example, metal objects or materials with high losses in place of the ambient air. Due to the sheath, also termed "spacer" herein, the conductor routing can be made independent of external influences.

The dielectric waveguide can further comprise a foil screen around the sheath along the dielectric waveguide. The foil screen can be provided to comply with an electromagnetic compatibility or to prevent a coupling into the dielectric waveguide.

The dielectric waveguide can further comprise an outer sleeve around the foil screen along the dielectric waveguide. External influences, for example weather influences, on the dielectric waveguide can be reduced hereby. The outer sleeve can also be arranged (for example directly) around the sheath along the dielectric waveguide. The foil screen can accordingly be omitted in this case.

Permittivities of sheath to fibre core can have a ratio of 1:2. Furthermore, permittivities of sheath to fibre core can have a ratio of approximately 1.5:2.25. That can correspond to a permittivity ratio of approximately 2/3=0.66. In particular, the permittivity ratio can have a value greater than 0.6 (or 0.61 or 0.62 or 0.63 or 0.64 or 0.65). In particular, the permittivity ratio can have a value smaller than 0.7 (or 0.69 or 0.68 or 0.67). The permittivity ratio can naturally vary around these values by approximately 5%.

The permittivity of the fibre core can be substantially homogeneous over the entire dielectric waveguide by the use of the same material of the first fibre core or the second fibre core.

The dielectric waveguide can further comprise a first tensile thread for the first fibre core and a second tensile thread for the second fibre core. The first fibre core can take up a space around the first tensile thread along the dielectric waveguide. The second fibre core can take up a space around the second tensile thread along the dielectric waveguide. The tensile thread is necessary in particular if the dielectric waveguide is manufactured as kilometer goods.

The tensile thread can be required in production for the provision of the dielectric waveguide. The production method can be an extrusion method in particular. By its provision, a precise distance can be set between the first fibre core and the second fibre core. The first tensile thread can define the centre point of the cross-section of the first fibre core in the cross-section of the dielectric waveguide. Furthermore, the second tensile thread can define the centre point of the cross-section of the second fibre core. Due to the arrangement of the first and the second fibre core relative to one another, the tensile threads arranged respectively centrally in the respective first and second fibre cores can be located outside of areas of high field intensity during use of the dielectric waveguide. The losses can thus be reduced.

The first fibre core and the second fibre core can have a diameter of approximately 0.5 mm to 1.6 mm (for example, 1 mm to 1.6 mm). Advantageous usage in the W band in particular can be provided hereby. In particular, the dielectric waveguide can be used in a frequency range between 75 GHz and 110 GHz. Furthermore, the dielectric waveguide can be provided for the D band (110 to 170 GHz). The first fibre core and the second fibre core can have a diameter of less than 1 mm (for example, 0.5 mm to 1 mm) for this. Exclusive use in the highest frequency range can likewise be envisaged.

It is likewise understood that the terms used here serve only to describe individual embodiments and are not to be regarded as a restriction. Unless otherwise defined, all technical and scientific terms used here have the meaning that corresponds to the general understanding of the expert in the specialist field relevant for the present disclosure; they should be interpreted neither too broadly nor too narrowly. If specialist terms are used inaccurately here and thus do not give expression to the technical concept of the present disclosure, these should be replaced by specialist terms that convey a correct understanding to the expert. The general terms used here should be interpreted on the basis of the definition existing in the dictionary or according to the context; too narrow an interpretation is to be avoided in this case.

It should be understood here that terms such as e.g. "comprise" or "contain" or "have" etc. signify the presence of the described features, numbers, components, parts or their combinations and do not exclude the presence or the possible addition of one or more other features, numbers, components, parts or their combinations.

Although terms such as "first" or "second" etc. are possibly used to describe various components, these components should not be restricted to these terms. One component is only to be distinguished from the other using the above terms. For example, a first component can be described as a second component without departing from the protective scope of the present disclosure; likewise a second component can be described as a first component. The term "and/or" comprises both combination of several objects connected to one another and any object of this plurality of the described plurality of objects.

If it says here that a component "is connected" to another component or "is in communication" with it, this can mean that they are thus directly connected; it should be noted here, however, that another component can lie in between. If it says, on the other hand, that a component is "directly connected" to another component, it is to be understood by this that no other components are present in between.

Further objectives, features, advantages and application possibilities result from the following description of exemplary embodiments, which are not to be understood as restrictive, with reference to the associated drawings. The same or identical components or elements are always provided with the same or similar reference characters. In the description of the present disclosure, detailed explanations of known connected functions or constructions are dispensed with if these deviate unnecessarily from the sense of the present disclosure. Here all features described and/or depicted show by themselves or in any combination the subject matter disclosed here, even independently of their grouping in the claims or their references. The dimensions and proportions of the components shown in the figures are not necessarily to scale in this case; they may diverge from what is shown here in embodiments to be implemented. In particular, the thickness of the lines, layers and/or regions may be exaggerated or understated in the figures for the sake of clarity.

The dielectric waveguide is now described on the basis of exemplary embodiments.

Figure 1:
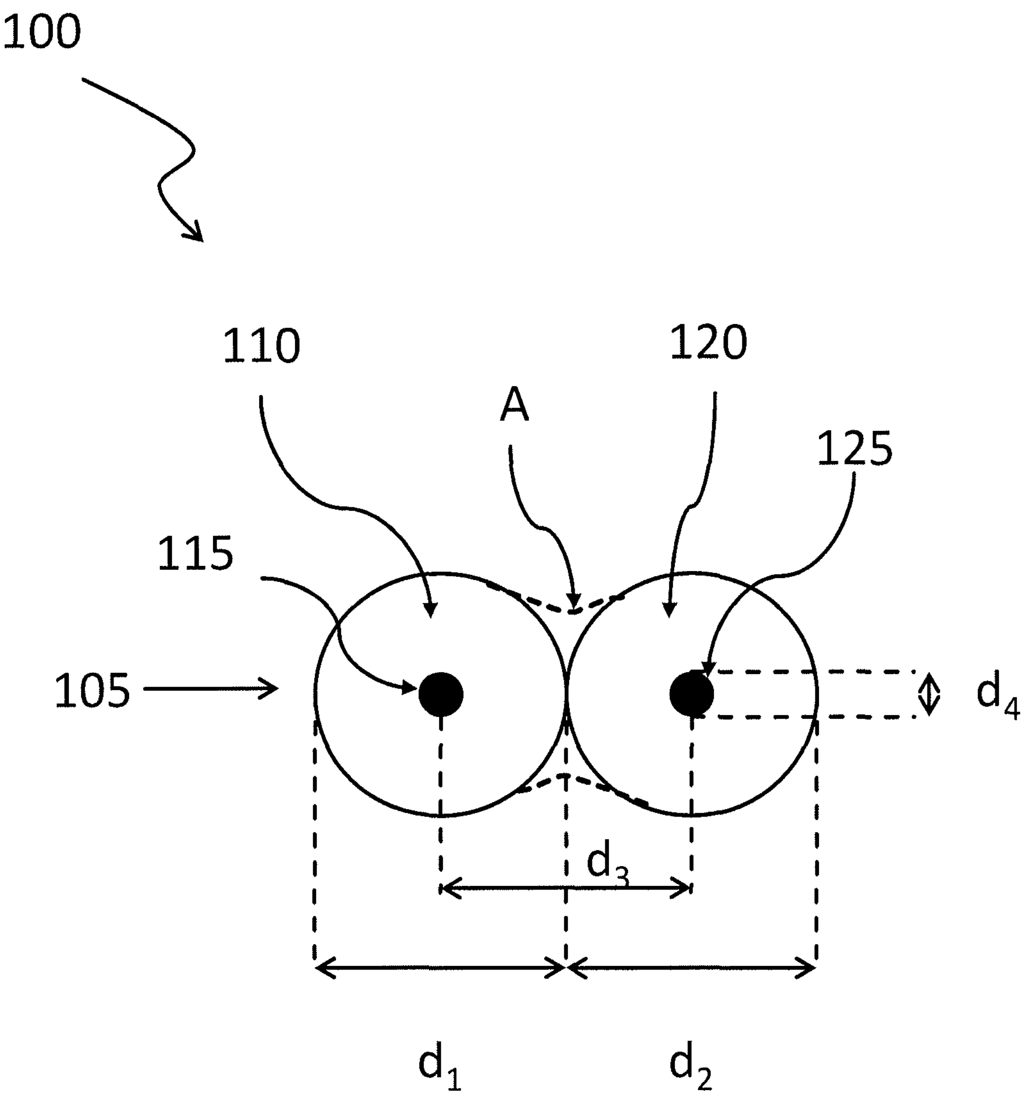
FIG. 1 shows a schematic depiction of a dielectric waveguide with fibre core and tensile threads.

FIG. 1 shows a schematic depiction of a dielectric waveguide 100 with fibre core 105 and tensile threads 115 and 125. The fibre core 105 comprises two fibre cores 110 and 120. The fibre cores 110 and 120 form the common fibre core 105 of the dielectric waveguide 100. By way of example, a tensile thread 115 or 125, which are required in production, is shown per fibre core 110 and 120 in FIG. 1. In the case of FIG. 1, air can be located in the environment of the fibre core 105. Likewise, the fibre core 105 in FIG. 2 can be used. The tensile threads 115 and 125 are spaced apart from one another (see spacing $d_3$). Here $d_3$ describes the spacing between the centre points of both fibre cores 110 and 120. The tensile threads 115 and 125 are each located centrally in the two fibre cores 110 and 120.

The two fibre cores 110 and 120 are melted here (seen in cross-section) along their longitudinal direction such that the distance $d_3$ corresponds maximally to a sum of the radii of the fibre cores 110 and 120 ($d_1/2+d_2/2$).

It is clear that the fibre cores 110 and 120 form the fibre core 105 such that due to the melting, the two fibre cores 110 and 120 do not assume an exactly circular shape, but transition into one another in an overlap area, see here the transition area A in FIG. 1. The transition area A can be formed by a smooth transition (in the form of a curve similar to splines) from a surface of the fibre core 110 to a surface of the fibre core 120. Thus a smooth hollow or trough can be formed between the two fibre cores 110 and 120 in transition area A. The fibre core 105 can thus have a concave structure in cross-section. The structure of the fibre core 105 can have two lateral areas and a central area. The lateral areas can each be circular in this case (see the two fibre cores 110 and 120 for this). The central area can be concave here (see transition area A for this) or have concave sections.

In particular, the spacing $d_3$ can be smaller than $d_1/2+d_2/2$. The spacing $d_3$, shown schematically in FIG. 1, of the tensile threads 115 and 125 thus represents the maximum. Due to the fact that the two fibre cores 110 and 120 are melted into one fibre core 105, the cross-sections of the fibre cores 110 and 120 can overlap. It is thus possible for spacing $d_3=d_1/4+d_2/4$, for example. In particular, it can be provided that $d_1/4+d_2/4<d_3<d_1/2+d_2/2$. Also, as shown in FIG. 1, the diameters of both fibre cores 110 and 120 can be identical ($d_1=d_2$). This yields the following result for the spacing of the centre points of the fibre cores 110 and 120: $d_1/2<d_3<d_1$. For example, the spacing $d_3$ of the centre points of the fibre cores 110 and 120 can lie in a range between $6*d_1/10<d_3<9*d_1/10$. In particular, the spacing $d_3$ of the centre points of both fibre cores 110 and 120 can be greater than $6*d_1/10$ (or $7*d_1/10$ or $8*d_1/10$ or $9*d_1/10$). The spacing $d_3$ of the centre points of both fibre cores 110 and 120 can also be smaller than $9*d_1/10$ (or $8*d_1/10$ or $7*d_1/10$ or $6*d_1/10$).

For example, the diameters $d_1$ and $d_2$ lie in a range between 1 mm and 1.6 mm. In particular, the diameters $d_1$ and $d_2$ can each be greater than 1.1 mm (or 1.2 mm or 1.3 mm). In particular, the diameters $d_1$ and $d_2$ can each be smaller than 1.7 mm (or 1.6 mm or 1.5 mm or 1.4 mm). The tensile threads 115 and 125 can likewise have the same or similar dimensions. The diameter $d_4$ of the tensile threads 115 and 125 can lie in a range from 0.05 mm to 0.4 mm, in particular 0.1 mm (or 0.2 mm, or 0.3 mm).

The double-circumference geometry shown in FIG. 1 of the fibre core 105 of the dielectric waveguide 100 can have a better insertion loss than a dielectric waveguide with a rectangular cross-section. This is due to the fact that in the area of maximal active-power density, less dielectric material and accordingly fewer dielectric losses act on the field.

For example, the material used for the fibre core 105 can be a weakly branched polymer chain, for example high-density polyethylene (HDPE). HDPE has a permittivity $\varepsilon_r$=2.25 and a loss factor of tan $\delta$=5*$10^{-4}$. This material cannot comply with various requirements in the automotive sector, however. For this reason, basic polypropylene (PP) with a permittivity of $\varepsilon_r$=2.26 and a loss factor of tan $\delta$=7*$10^{-4}$ can also be used for the fibre core 105. This material very closely resembles the dielectric properties of HDPE. The transmission characteristic of the dielectric waveguide 100 made of basic PP is poorer in contrast to HDPE, however.

To ensure long line lengths, the manufacture of the dielectric line 100 can be based on the extrusion of a dielectric material (of the fibre cores 110 and 120) around a carrier or tensile thread 115 and 125. The respective tensile thread 115 and 125 can be made of polyethylene terephthalate (PET) ($\varepsilon_r$=2.91 and tan $\delta$=1*$10^{-2}$ at f=77 GHz) in this case.

Further details and aspects are mentioned in connection with the exemplary embodiments described above or below. The exemplary embodiment shown in FIG. 1 can have one or more optional additional features, which correspond to one or more aspects mentioned in connection with the proposed concept or exemplary embodiment and variants described below with reference to FIG. 2.

Figure 2:
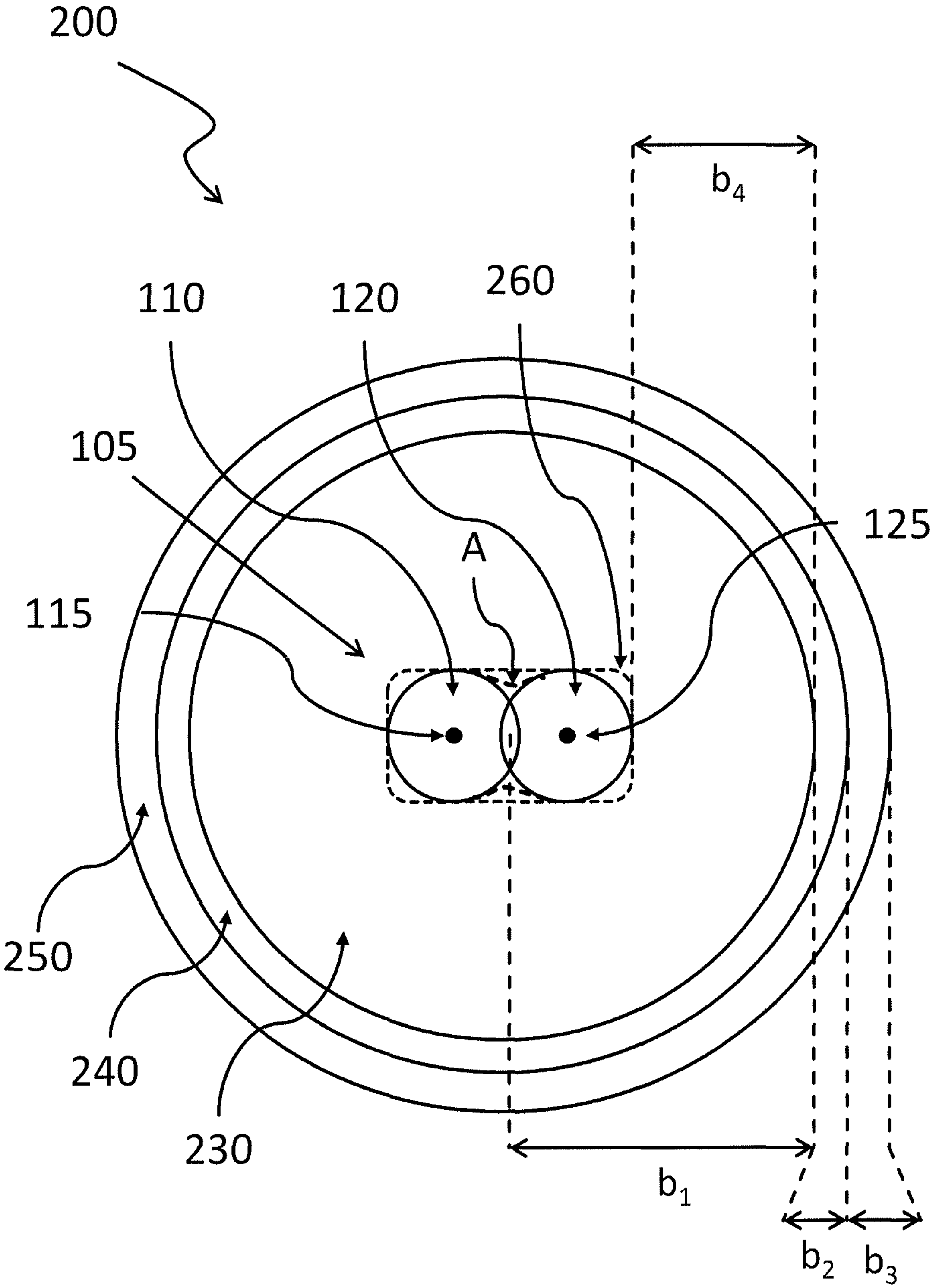
FIG. 2 shows a schematic depiction of a dielectric waveguide with further layers around the fibre core.

FIG. 2 shows a schematic depiction of a dielectric waveguide 200 with further layers 230, 240 and 250 around the fibre core 105. The dielectric waveguide 200 represents an expansion of the concept from FIG. 1 and can be supplemented by the features described in FIG. 1. Relative to the dielectric waveguide 100 presented from FIG. 1, a dielectric waveguide 200 is shown in FIG. 2 that has further elements to the fibre core 105, namely sheath 230, foil screen 240 and outer sleeve 250. In FIG. 2, the sheath 230 encloses the fibre core 105, which is formed jointly by the two fibre cores 110 and 120 by melting. It is to be seen in FIG. 2 that the two fibre cores 110 and 120 can overlap. The degree of overlapping can correspond to FIG. 1. The sheath 230 can be described or used here as spacer 230.

The material of the spacer can be a material with low dielectric losses, for example. Furthermore, the material can have a low dielectric constant. The diameter of this spacer 230 ($b_1$*2) can also be dimensioned such that the field intensity outside of the spacer 230 has decayed to the extent that it cannot be influenced from outside. In particular, the diameter $b_1$*2 can depend in this case on the permittivity of the fibre core 105 and of the spacer 230 as well as of the frequency range used. For example, the spacer 230 can have a radius $b_1$ in the range of 1 mm to 5 mm. In particular, $b_1$ can be greater than 2 mm (or 3 mm or 4 mm or 4.5 mm or 4.75 mm or 4.8 mm). The spacer 230 can thus enclose the fibre core 105 of the dielectric waveguide 200 to protect it from environmental influences. In particular, care can be taken to ensure that the spacer 230 creates a space as large as possible around the fibre core 105. For example, such a distance (shortest distance between outer boundary of the spacer 230 and fibre core 105) b can be greater than 2 mm (or 3 mm or 4 mm or 5 mm or 6 mm). The amount of spacer material can represent a trade-off between environmental influences and material.

One option for realising the spacer 230 is a foam extrusion. The cross-section in this case is circular (see also FIG. 2). The degree of foaming can be selected in the extrusion process such that the ratio of dielectric constants (fibre core 105 to spacer 230) substantially corresponds to the target ratio 1/2. For most materials, this means selecting a degree of foaming that is as high as possible. To prevent melting between fibre core 105 and spacer 230, a separating foil 260 can optionally be located between these two elements. Possible materials for the foam material are polyethylene (PE) and polypropylene (PP). Foamed PP has a permittivity of $\varepsilon_r$=1.5 and a loss factor of tan $\delta$=5.5*$10^{-4}$.

Another possibility for realising the spacer 230 is strapping with expanded polytetrafluorethylene (ePTFE).

For EMC reasons, it can be sensible depending on the application to enclose the spacer 230 with a conductive foil screen 240. The line is thus shielded electrically from the environment. A thickness $b_2$ of the foil screen 240 can be less than 0.2 mm (or 0.15 mm or 0.1 mm or 0.05 mm).

To protect the dielectric waveguide from environmental influences (UV radiation or chemical processes), an outer sleeve 250 in the form of a jacket, for example made of PVC, can be provided depending on the application. A thickness $b_3$ of the outer sleeve can be less than 0.5 mm (or 0.45 mm or 0.4 mm or 0.35 mm) here. A thickness $b_3$ of the outer sleeve 250 can be greater than 0.2 mm (or 0.25 mm or 0.3 mm or 0.35 mm) here. Furthermore, the outer sleeve 250 can be a dissipative layer. An adequate shielding effect can thus be achieved by losses in this layer. The outer sleeve 250 can consist of a slightly conductive PVC material or have a slightly conductive PVC material.

Further details and aspects are mentioned in connection with the exemplary embodiment described above and its variants. The exemplary embodiment shown in FIG. 2 can have one or more optional additional features, which correspond to one or more aspects mentioned in connection with the proposed concept or the exemplary embodiment described above (e.g. FIG. 1) and its variants.

Figure 3:
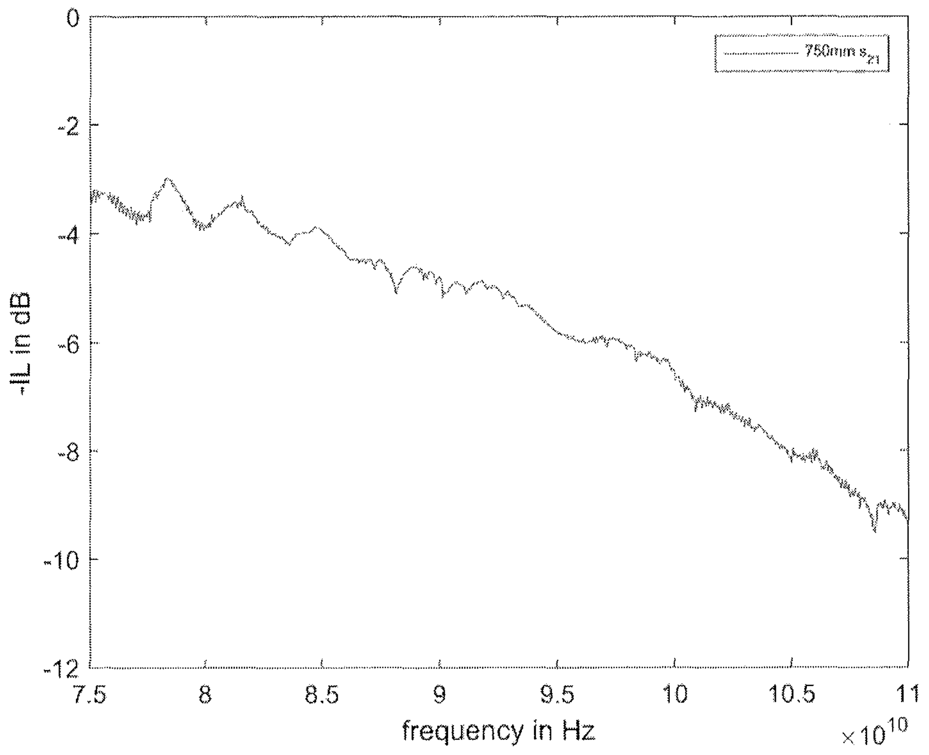
FIG. 3 shows a schematic depiction of attenuation of a dielectric waveguide without sheath.
Figure 4:
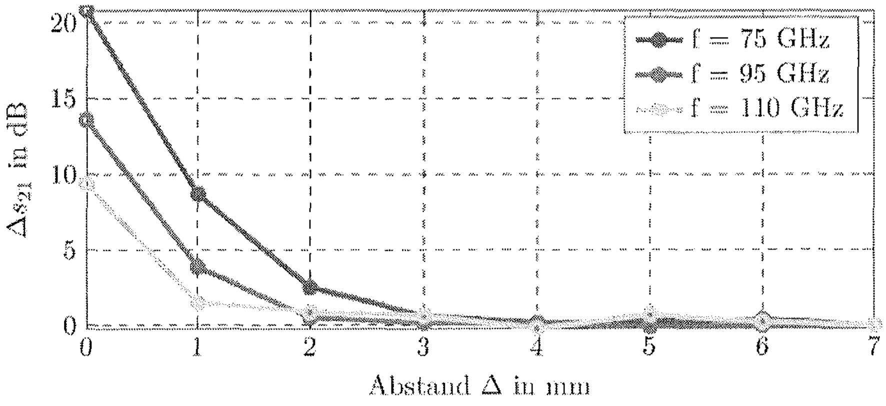
FIG. 4 shows a schematic depiction of an attenuation increase of a dielectric waveguide without sheath depending on a distance from an absorber.
Figure 5:
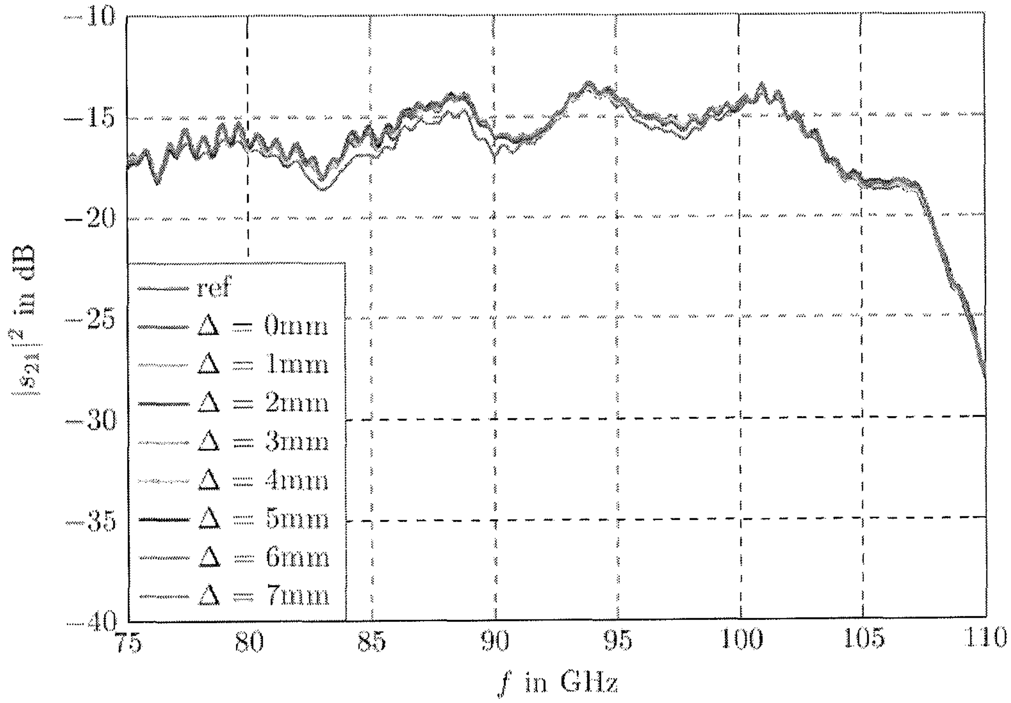
FIG. 5 shows a schematic depiction of attenuation of a dielectric waveguide with sheath depending on a distance from an absorber.

FIG. 3 shows a schematic depiction of attenuation of a dielectric waveguide without sheath. FIG. 4 shows a schematic depiction of a dielectric waveguide without sheath depending on a distance from an absorber. The absorber can be provided in the form of the outer sleeve, as described in FIG. 2. FIG. 5 shows a schematic depiction of a dielectric waveguide with sheath depending on a distance from the absorber.

The aspects described here can be provided for broadband and robust signal guidance, in particular in cars in the course of automation.

The aspects and features that were mentioned and described together with one or more of the examples and figures described in detail above can also be combined as with one or more of the other examples to replace a similar feature of the other example or to introduce the feature additionally into the other example.

Furthermore, the following claims are incorporated hereby into the detailed description, where each claim can stand as a separate example on its own. If each claim can stand as a separate example on its own, it should be noted that, although a dependent claim in the claims can refer to a particular combination with one or more other claims, other exemplary embodiments can also include a combination of the dependent claim with the subject matter of any other dependent or independent claim. These combinations are proposed here unless it is indicated that a certain combination is not intended. Furthermore, features of a claim are also to be included for any other independent claim, even if this claim is not made directly dependent on the independent claim.

The invention claimed is:

1. Dielectric waveguide, in which a fibre core is formed by a first fibre core and a second fibre core, the first fibre core and the second fibre core having an intersection in the cross-section of the dielectric waveguide, wherein the dielectric waveguide has a first tensile thread for the first fibre core and a second tensile thread for the second fibre core, the first fibre core taking up a space around the first tensile thread along the dielectric waveguide and the second fibre core taking up a space around the second tensile thread along the dielectric waveguide.

2. Dielectric waveguide according to claim 1, the first fibre core and the second fibre core running substantially parallel along the dielectric waveguide.

3. Dielectric waveguide according to claim 1, the first fibre core and the second fibre core each being substantially circular and having substantially identical diameters.

4. Dielectric waveguide according to claim 1, further having a sheath around the fibre core along the dielectric waveguide, the sheath having a permittivity that is smaller than the permittivity of the fibre core, and the sheath having a diameter that is at least twice as great compared with one of the diameters of the first fibre core and the second fibre core.

5. Dielectric waveguide according to claim 4, further having a foil screen around the sheath along the dielectric waveguide.

6. Dielectric waveguide according to claim 5, further having an outer sleeve around the foil screen or the sheath along the dielectric waveguide.

7. Dielectric waveguide according to claim 1, the first fibre core and the second fibre core having a diameter of approximately 0.5 mm to 1.6 mm.

8. Dielectric waveguide, in which a fibre core is formed by a first fibre core and a second fibre core, the first fibre core and the second fibre core having an intersection in the cross-section of the dielectric waveguide, wherein centre points of the respective cross-sections of the first fibre core and the second fibre core have a spacing that is greater than half a diameter of one of the first fibre core and the second fibre core and smaller than the diameter of one of the first fibre core and the second fibre core.

* * * * *